United States Patent
Hellier et al.

(10) Patent No.: US 7,603,789 B2
(45) Date of Patent: Oct. 20, 2009

(54) MEASUREMENT PROBE

(75) Inventors: Peter Kenneth Hellier, North Nibley (GB); David Roberts McMurtry, Dursley (GB)

(73) Assignee: Renishaw PLC, Wotton-Under-Edge (GB)

( * ) Notice: Subject to any disclaimer, the term of this patent is extended or adjusted under 35 U.S.C. 154(b) by 279 days.

(21) Appl. No.: 11/885,545

(22) PCT Filed: Mar. 24, 2006

(86) PCT No.: PCT/GB2006/001095

§ 371 (c)(1),
(2), (4) Date: Sep. 4, 2007

(87) PCT Pub. No.: WO2006/100508

PCT Pub. Date: Sep. 28, 2006

(65) Prior Publication Data

US 2008/0163507 A1    Jul. 10, 2008

(30) Foreign Application Priority Data

Mar. 24, 2005    (GB) ................................. 0506158.5

(51) Int. Cl.
*G01B 5/12*    (2006.01)
(52) U.S. Cl. ...................................................... 33/561
(58) Field of Classification Search .................. 33/559, 33/560, 561
See application file for complete search history.

(56) References Cited

U.S. PATENT DOCUMENTS

| | | | | | |
|---|---|---|---|---|---|
| 4,136,458 | A | * | 1/1979 | Bell et al. | 33/561 |
| 4,553,001 | A | * | 11/1985 | Kroetsch | 33/561 |
| 5,103,572 | A | * | 4/1992 | Ricklefs | 33/558 |
| 5,111,592 | A | * | 5/1992 | Aehnelt et al. | 33/561 |
| 5,228,352 | A | | 7/1993 | McMurtry et al. | |
| 5,319,858 | A | * | 6/1994 | Coy | 33/561 |
| 5,327,657 | A | | 7/1994 | Hajdukiewicz et al. | |
| 6,678,966 | B1 | * | 1/2004 | Koga et al. | 33/558 |
| 7,228,642 | B2 | * | 6/2007 | Enderle et al. | 33/561 |
| 7,347,000 | B2 | * | 3/2008 | Jordil et al. | 33/561 |
| 2004/0118000 | A1 | | 6/2004 | Roth et al. | |
| 2005/0278969 | A1 | * | 12/2005 | Jordil et al. | 33/559 |

FOREIGN PATENT DOCUMENTS

| | | |
|---|---|---|
| EP | 0 068 899 A2 | 1/1983 |
| WO | WO 01/96809 A1 | 12/2001 |
| WO | WO 02/068904 A1 | 9/2002 |
| WO | WO 2004/051181 A1 | 6/2004 |

\* cited by examiner

*Primary Examiner*—G. Bradley Bennett
(74) *Attorney, Agent, or Firm*—Oliff & Berridge, PLC

(57) ABSTRACT

A probe for position determining apparatus has a probe body (18) and a workpiece-contacting stylus (14). A strain sensitive structure connects the probe body and the stylus, and includes bendable members (32). The bendable members have an asymmetric cross-section, e.g. "T" shaped. A strain gauge (33) is mounted to the stem of the "T" to detect the bending caused when the stylus contacts a workpiece. This enables the strain sensitive structure to be both robust and sensitive to the bending.

13 Claims, 7 Drawing Sheets

MEASUREMENT PROBE

The present invention relates to a measurement probe for use in determination of dimensions of articles like workpieces on positioning determining apparatus such as machine tools, coordinate measurement machines and other machines using coordinate positioning.

The probe may include a workpiece contact element such as a stylus which is urged out of a rest state when contact with the workpiece is made. This urging can be detected and a signal indicating the said workpiece contact may be generated to provide an indication of the workpiece position according to the coordinate positioning system used.

Many different types of probes as described above are known. Ideally such probes should be very sensitive to force acting on the probe's stylus or other contact element, and yet be reasonably robust to prevent damage to the probe e.g. when the probe is dropped or accidentally driven into the workpiece violently.

Typically contact measurement probes fall into two categories: those that produce a trigger signal very quickly when workpiece contact is made (so called "touch trigger probes"); and those which have a variable signal indicative of the amount of deflection of the stylus relative to the probe body (so called "analogue probes" "or scanning probes").

Analogue probes are used generally in a manner such the stylus moves across the workpiece and the probe generates many data points corresponding to the profile of the workpiece. Analogue probes are necessarily sensitive and consequently are generally not suited to rugged use.

Touch trigger probes are simpler and better suited to applications such as use on a machine tool, where adverse conditions such as knocks and vibration are encountered. Touch trigger probes conventionally have an electrical switch type arrangement which is opened (or closed) on workpiece contact.

Touch trigger probes are generally mechanical in nature and have moving parts which can become worn or damaged.

In order to overcome the above disadvantages probes which employ strain gauges have been developed. One such probe is shown in U.S. Pat. No. 5,327,657. FIG. 9 of that document shows a strain gauge cell 334 which is strained in use by the stylus shown at the lower part of FIG. 9. The cell 334 has three legs extending toward the stylus. Whilst this probe is sensitive it is not particularly robust, particularly if the stylus is knocked. A similar probe is shown in EP 68899.

Another strain gauge probe is shown in International Patent Application No. WO01/96809A1, FIG. 3 of which shows a strain gauge support structure 34 having three legs. In order to provide more robustness an additional stylus support 42 is provided. This additional support allows the strain gauge support structure 34 to be reduced in stiffness and thus made more sensitive. Overall, the probe structure is not compact.

The inventor of the present invention has proposed a sensitive touch trigger probe which is robust which in the embodiments described herein negates the requirement for additional stylus support.

The present invention provides a measurement probe, the probe comprising a probe body, a workpiece contacting stylus, and a strain sensitive structure connecting the body and stylus, the stylus extending generally along an axis, the structure having a plurality of members connecting the stylus to the body extending substantially in one plane, at least one of the members having a strain sensing element associated therewith, wherein the at least one of the members has a cross-section in a direction perpendicular to the plane, which is asymmetrical.

Thus embodiments of the invention provide a strain sensing probe which has at least one strain sensing element associated with a strain sensing member. The member may have a neutral bending axis (i.e. an axis which is neither compressed nor stretched), which is closer to one side of the member than an opposite side by virtue of the member's asymmetry.

The result of this arrangement is that the strain sensing element can be placed further from the neutral axis on one side of the member than the opposite side of the member so, for the same member stiffness a greater strain sensitivity can be achieved.

It is possible that composite members could be produced, as described below, which whilst being symmetrical in cross-section, have a neutral axis which is closer to one side of the member than the other. Such members can be employed also for increased sensitivity and robustness, and are considered to be asymmetric for the purposes of the paragraphs above.

Embodiments of the invention will now be described with reference to the accompanying drawings, wherein.

Figure 4:
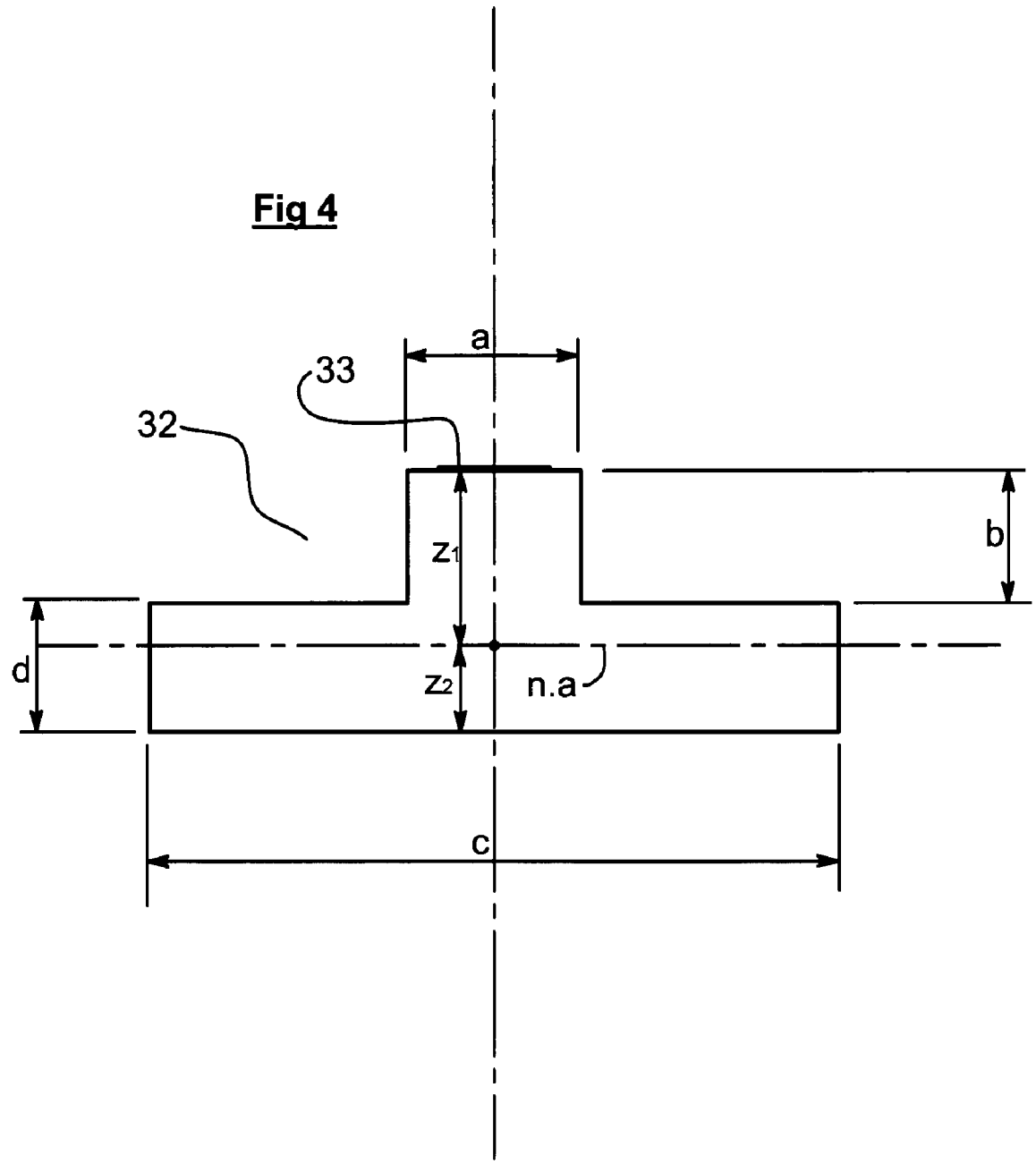
FIG. 4 shows a cross-section through the member in the plane 4-4 shown in FIG. 3.
Figure 5A:
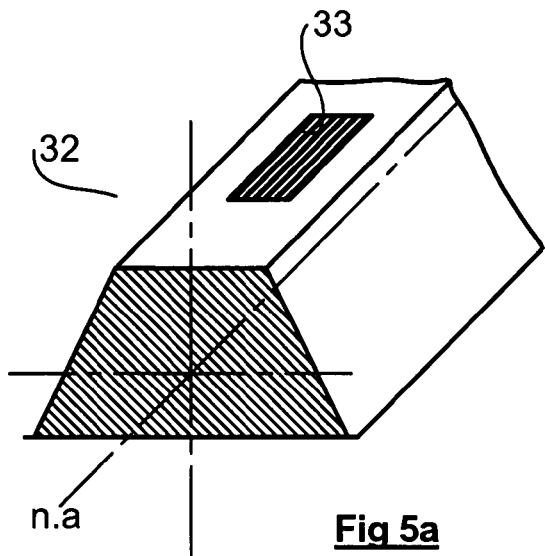
Figure 6:
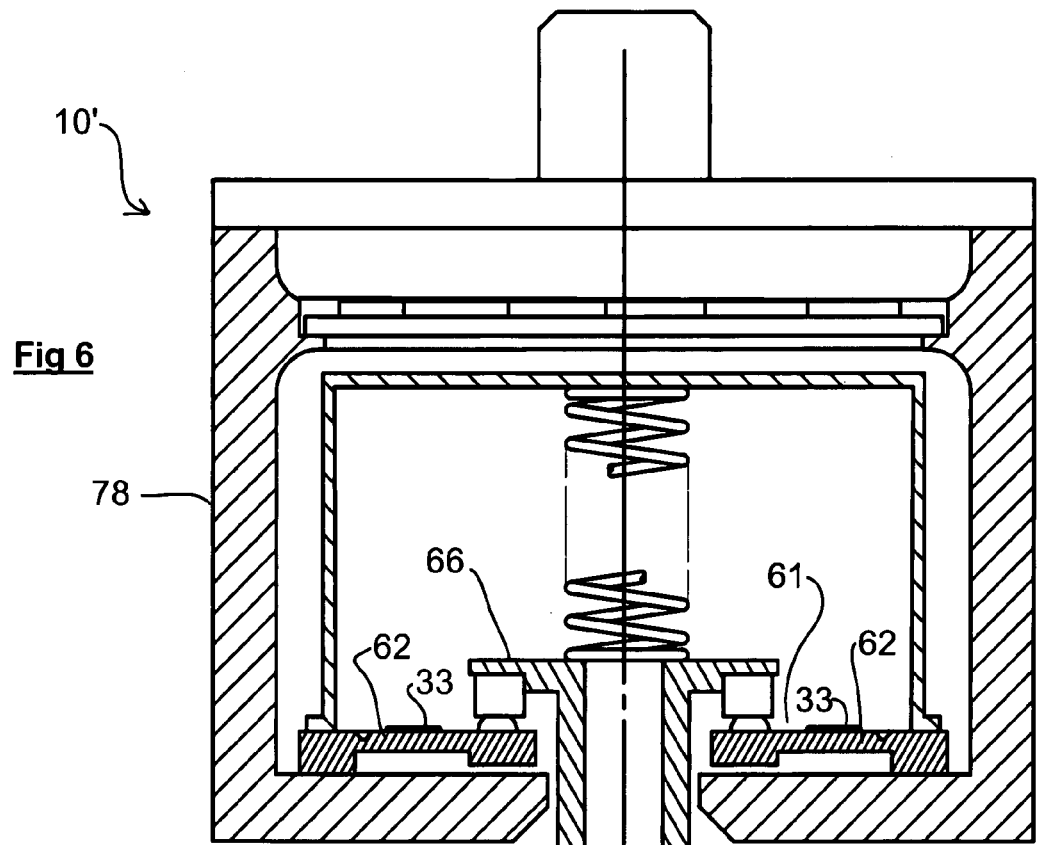
Figure 7:
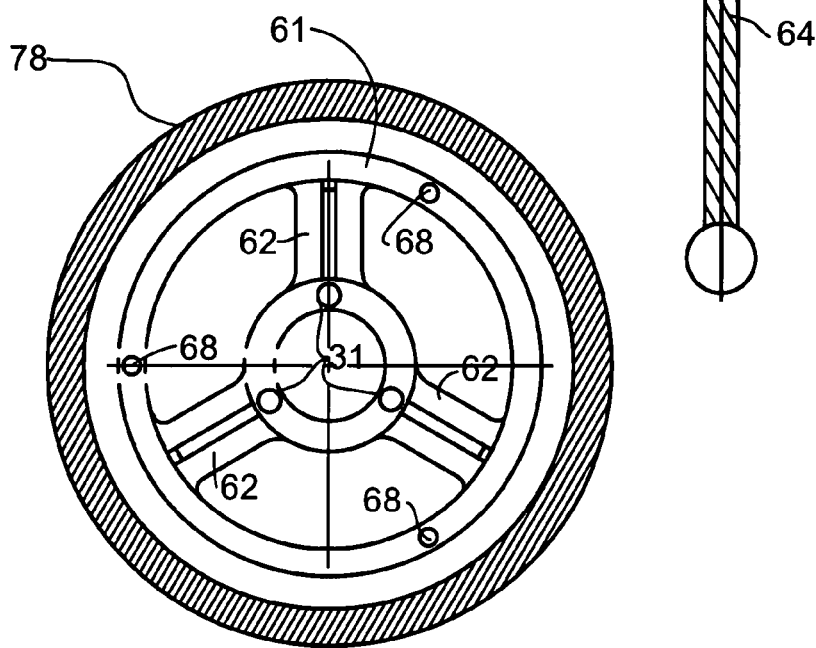
Figure 8:
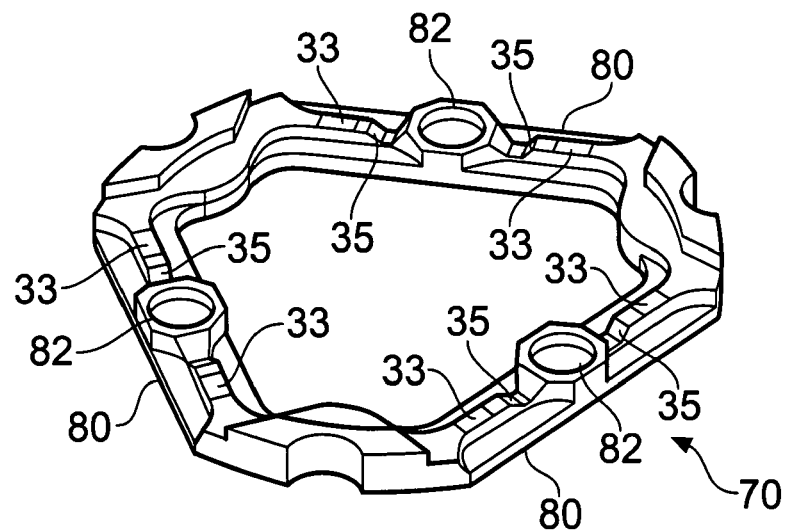

FIGS. 5a,b,c and d show alternative cross-sections to the cross-section shown in FIG. 4;

FIG. 6 shows an alternative measurement probe;

FIG. 7 shows a detail of components of the probe shown in FIG. 6;

FIG. 8 shows a further alternative strain sensing member; and

Figure 9:
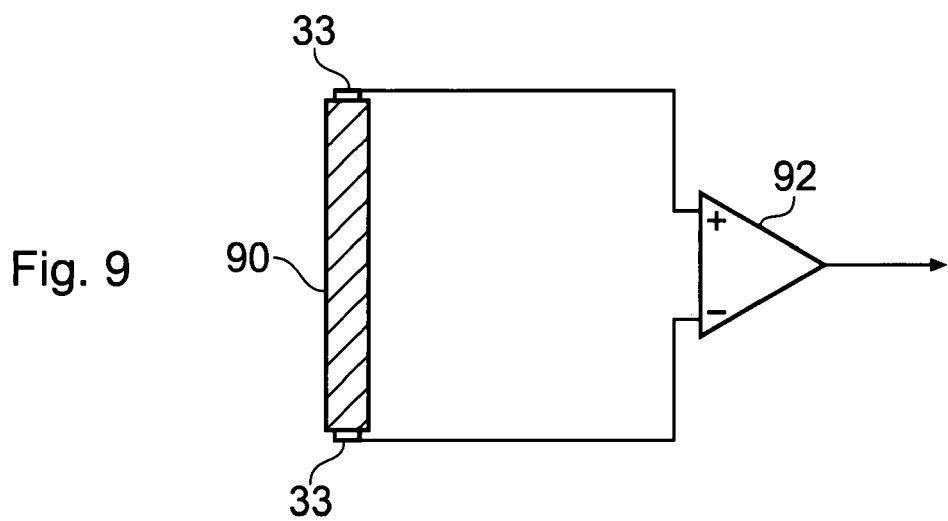
Figure 10:
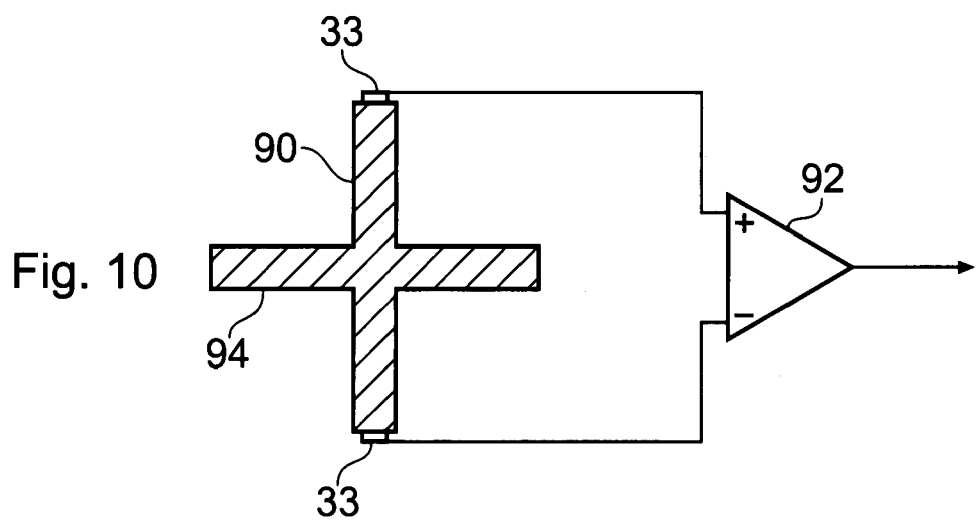

FIGS. 9 and 10 are cross-sections of still further alternative strain sensing members.

Figure 1:
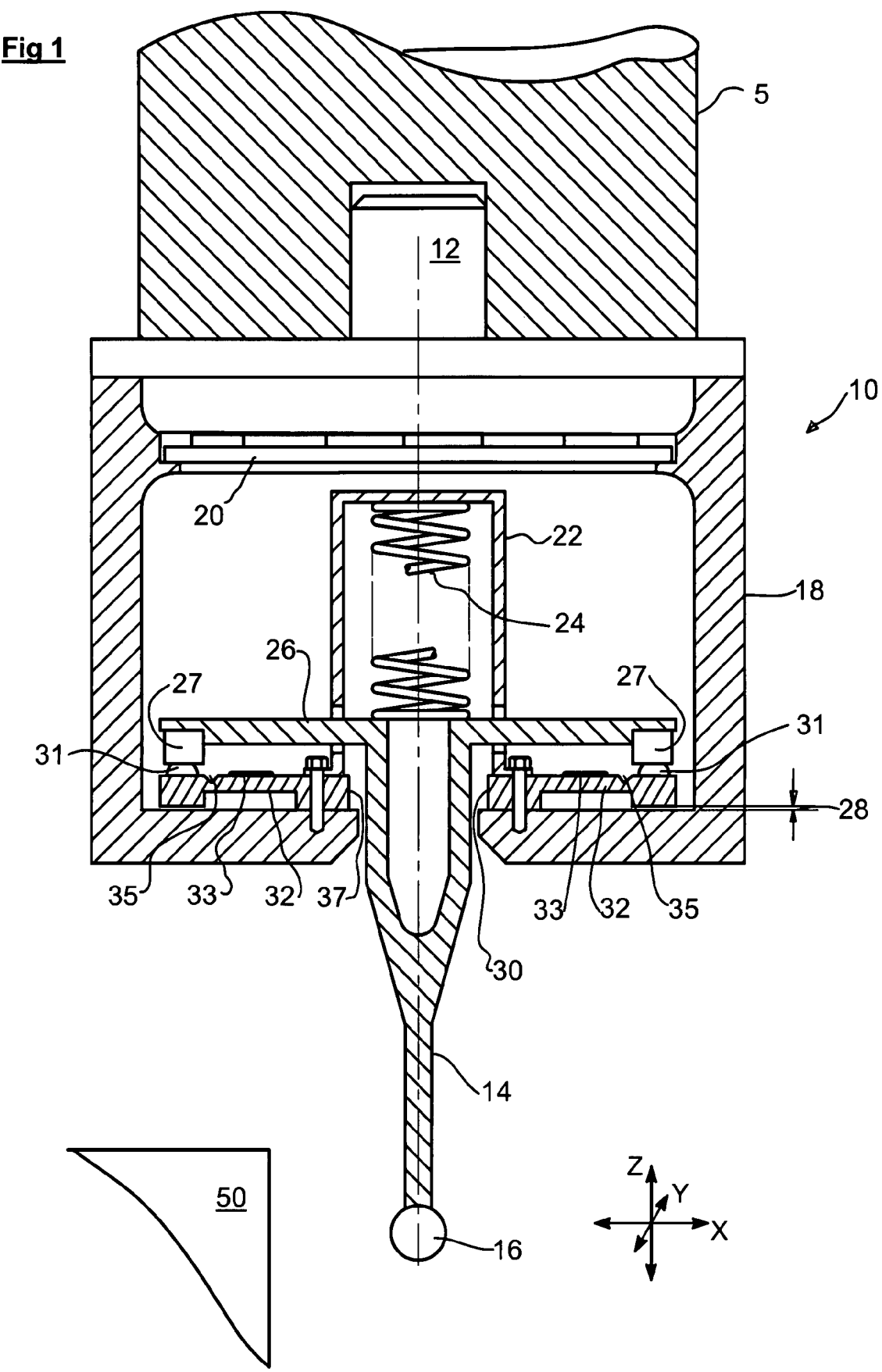
FIG. 1 shows a measurement probe employing the invention.

A dimensional measurement probe 10 is shown in FIG. 1 which is attachable to a machine 5 via a boss 12. The machine is typically one which can determine the coordinates of the probe e.g. in xy and z planes.

The probe has a stylus 14 including a tip 16 for contact with a workpiece or other artefact 50 to be measured. The probe is moved by the machine relative to the artefact 50 and contact of the stylus tip with the artefact 50 is sensed by the mechanism within the probe 10. The probe produces a signal which is sent to the machine in order to determine the probe's coordinates. In this way the coordinates of the surface of the artefact can be obtained.

The probe 10 includes a main body 18, a circuit board 20, a spring cage 22, a compression spring 24, upper member 26 of stylus 14 and a strain sensing element 30. For clarity the view of the probe is a part-section in the sectional plane shown as 1-1 in FIG. 2. This plane is not completely flat but includes two planes at 120° to each other.

In operation force is exerted on the stylus tip in the x,y or z directions or combinations of these directions. The force causes flexing of the radially extending arms 32 of the sensor element 30 relative to the body 18 to which the sensor element is fixed at central portion 37. Excessive force on the stylus in the x or y directions, or pulling the stylus in the z direction away from the probe body, will result in closing of the gap 28 between the sensor element 30 and the body 18. Thus excessive strain on the sensor element 30 cannot take place. Further force on the stylus causes the compression of spring 24 resulting in the disconnection between the stylus upper member or stylus holder 26 and the sensor element 30 against the force of the compression spring 24. Removal of the further excessive force allows the stylus to reseat against the sensor element 30. The contact between this upper member 26 and the sensor element 30 is in the form of a kinematic location having a total of six points of contact. In this instance the kinematic location is formed from three balls 31 on the sensor, each one nesting between a pair of rollers 27 on the member 26. Thus advantageously, reseating is possible into a repeatable rest position if excessive force is exerted on the stylus.

Figure 2:
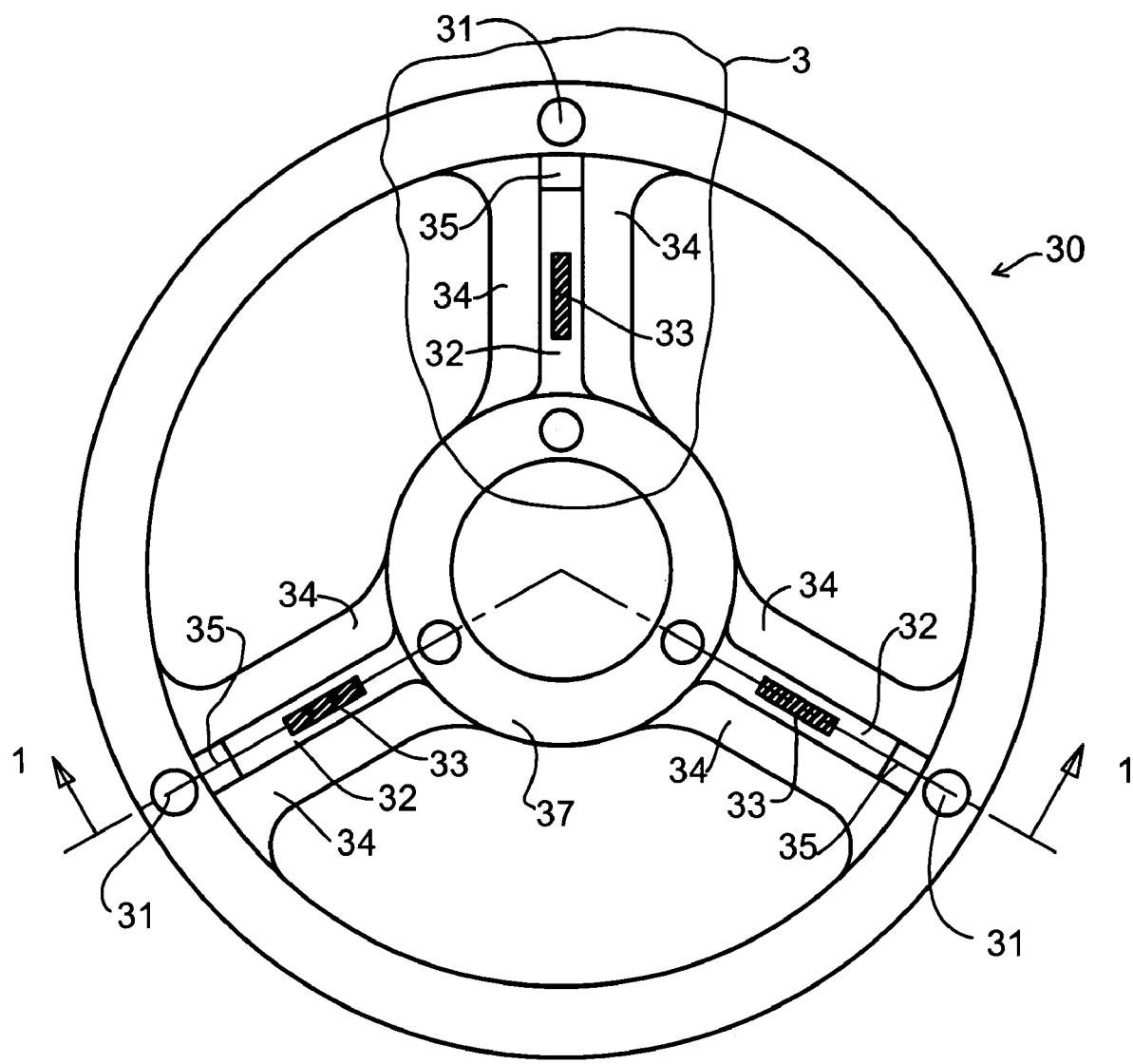
FIG. 2 shows details of a strain sensing member shown in FIG. 1.

FIG. 2 shows the sensor element 30 in more detail. The element 30 is produced as one piece, e.g. of machined metal. Each of the three balls 31 affixed to the surface of the element 30 has in use force exerted on them. When the stylus tip 16 contacts the workpiece the force exerted on the balls is altered. This in turn causes strain to be induced in radial arms 32. A semiconductor strain gauge 33 is secured to each of the arms 32. Each strain gauge provides a change in output if the strain in the arm is altered. Thus stylus contact with article 50 can be detected. Circuit board 20 enables such detection. An example of a circuit suitable for use in this invention is described in U.S. Pat. No. 5,228,352.

Figure 3:
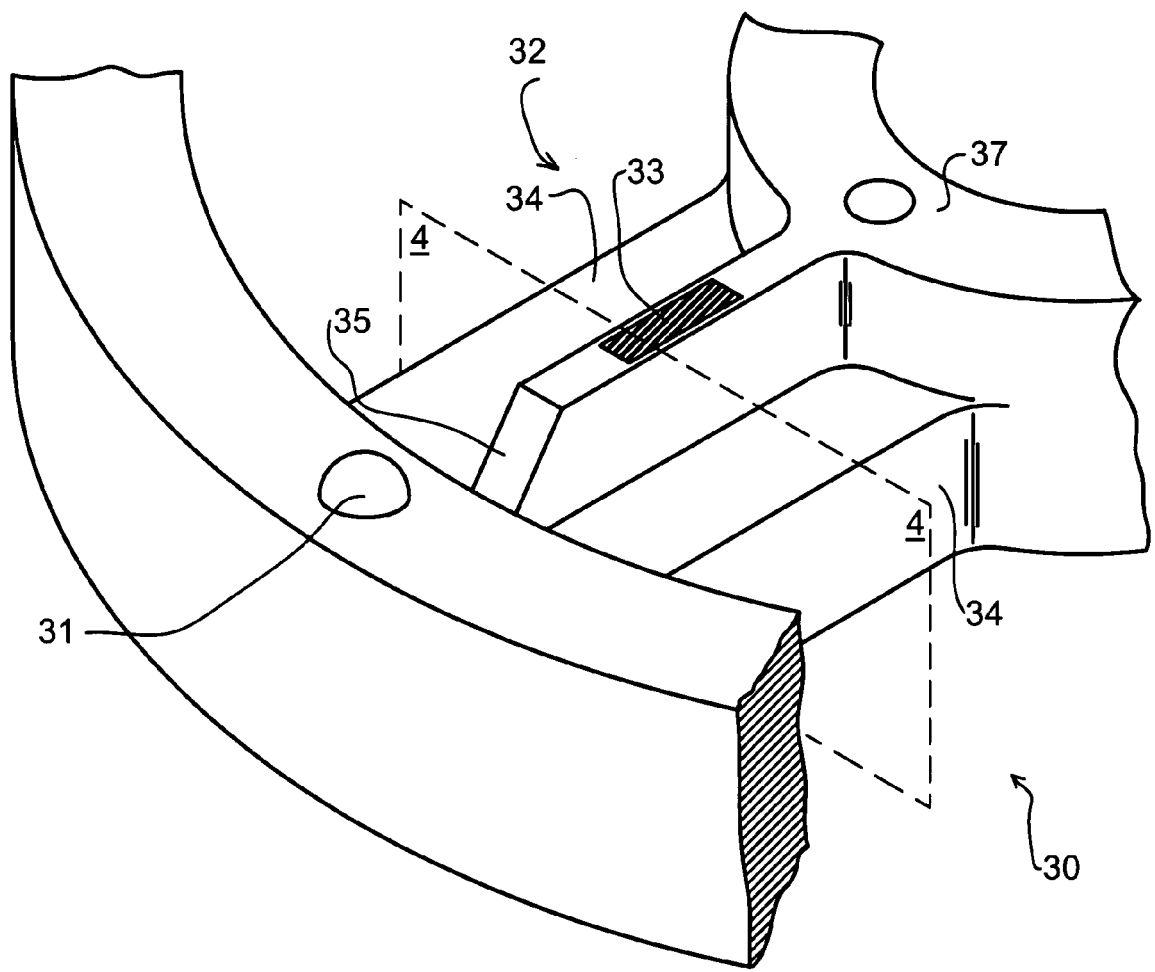
FIG. 3 shows further details of the strain sensing member shown in FIG. 2.

There are three radially extending arms 32 shown, although other numbers of arms may be employed. FIG. 3 shows an arm 32 in more detail. The area shown in FIG. 3 is that inside the cut line 3 in FIG. 2. The preferred sectional shape of the arm is an upside down "T" as shown in FIG. 3. However, other sections are envisaged e.g. as shown in FIGS. 5a,b,c and d. A strain gauge 33 is mounted to the uppermost surface of the flange which forms the stem of the "T" by means of two-part adhesive. The "T" shape of the arm improves responsiveness of the strain sensing member 30.

It would be possible to use a regular thin section e.g. rectangular in place of the "T" section shown to provide the required sensitivity of the strain sensing member. However, such a section will be lacking in stiffness or if made thicker will then become insensitive. It has been found by the inventor that the "T" section is both stiff for robustness and sensitive to forces acting on the stylus. For a given stiffness, more bending is experienced at the locations of the strain gauges 33 than would otherwise be the case. This also leads to an improved signal to noise ratio.

Also it has been found that a notch 35 formed in the upper flange forming the stem of the "T" shape produces a better resultant strain reading. This modifies the bending of the arm 32, causing the arm to deflect in use in the manner of a cantilever. The arm would be forced into an "S" shape under load if no notch were present, and this would produce less resultant strain at the position of the strain gauge.

FIG. 4 shows a section of the arm 32 in the plane 4-4 shown in FIG. 3. The relative sizes of the section are shown. It has been found that a suitable size if "a" is equal to 1 then "b" should be in the range of about 1-2, "c" should be in the range of about 3-6 and "d" should be in the range of about 0.5-1.5. Axis n.a shows the neutral or bending axis. It can be seen that the distance Z1 between the strain sensitive element 33 and the neutral bending axis is greater than the distance Z2 between the neutral axis and the fair line of the arm's surface opposite to the element 33.

Figure 5B:
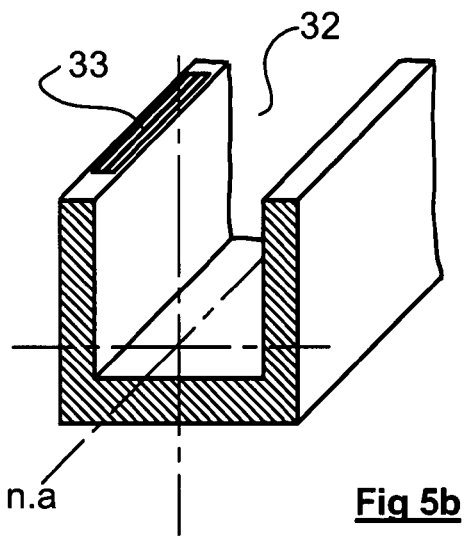
Figure 5C:
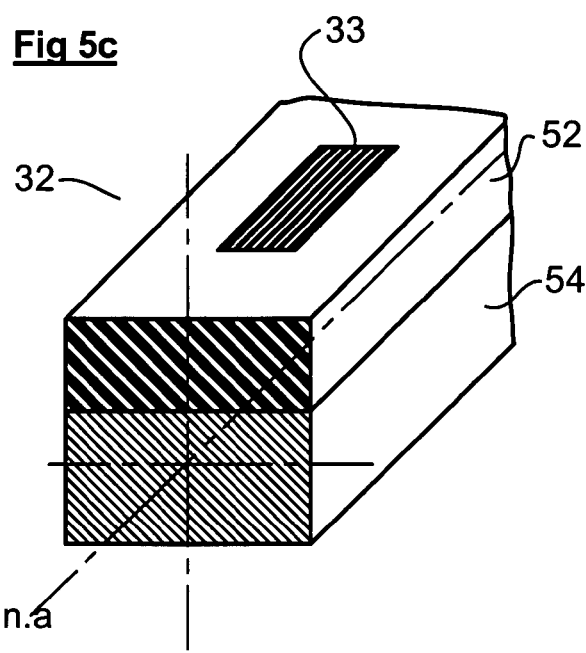
Figure 5D:
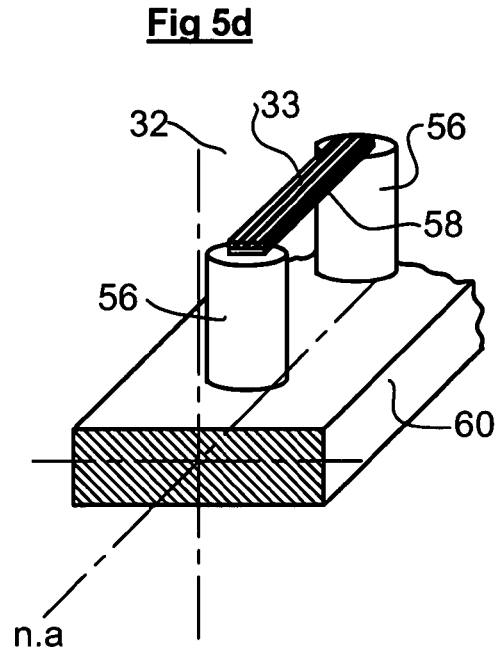

FIGS. 5a,b,c and d show examples of other sectional shapes for the arm 32 usable in place of the T section shown in FIG. 4. FIG. 5a shows a trapezoidal section, the strain gauge 33 being mounted to the top face as shown. FIG. 5b shows a U shaped section, the strain gauge 33 being mounted to one of the upper edges of the U as shown. FIG. 5c shows a composite structure having an upper section 52 which is less stiff than a lower section 54. The strain gauge is mounted as shown. The materials could be aluminium or fibreglass (52) and steel (54). Alternatively, the two sections in FIG. 5c could be of the same material but perforated with holes at different densities such that they have different stiffnesses. Or the density of such perforation could vary gradually from top to bottom of a single section. FIG. 5d shows a base 60, two spacers in the form of pillars 56, a strain gauge support 58, and strain gauge 33 mounted to the support 58.

In each of FIGS. 5,a,b,c and d the respective neutral axis n.a is shown. It will be noted that each strain gauge 33 is mounted further from the neutral axis n.a than the distance between the neutral axis and the face of the arm 32 opposite to the face where the strain gauge is mounted. As stated above, this results in a structure the strain of which can be measured readily but which can be made relatively stiff, and therefore robust. Notches can be provided, in a similar manner and for the same reason as the notch 35 in FIGS. 1-3.

FIG. 6 shows a measurement probe 10' of similar construction to that shown in FIG. 1. Again a true section is not shown, rather a section having a 120° angle is shown as for FIG. 1. In FIG. 6 the upper member 66 of stylus 64 bears on an inner portion of strain sensing structure 61. In turn strain is exerted in radial arms 62. Strain sensing element 70 is fixed at its periphery to housing 78. Other details, and the functioning of the probe, are similar to the probe of FIG. 1.

FIG. 7 shows assembly detail of the probe shown in FIG. 6. The securement of strain sensing structure 61 to housing 78 is by means of three fixings 68. The position of these fixings is such that neither compression nor tension of arms 62 is induced when housing 78 expands or contracts, due for example to thermal effects.

FIG. 8 shows a strain sensitive structure 70, which may be used in place of the sensor structure 30 in FIGS. 1-2. Instead of the three radial arm members 32, strain gauges 33 are affixed to three members 80, which extend generally circumferentially around a generally triangular ring. A cup 82 in the middle of each member 80 holds a respective one of the balls 31 shown in FIGS. 1-2, against which the stylus holder 26 bears. The members 80 have "T" shaped cross-sections and notches 35, as previously. A complete ring structure is not essential to this embodiment: three separate members 80 could be used, extending generally circumferentially. Or the balls 31 could be located at the ends of each arm, instead of in the middle.

FIG. 9 shows an alternative arm member 90 for use instead of the arm members 32 of FIGS. 1-4. It is shown in cross-section as in FIG. 4, but has a thin rectangular cross-section instead of "T" shaped. Two strain gauges 33 are mounted on opposing short edges of the rectangular cross-section, and are therefore well spaced apart. The electrical outputs of the two strain gauges are taken to the positive and negative inputs of a differential amplifier 92, which combines them differentially. Because of the thin rectangular cross-section, and the differential processing, good sensitivity to bending is achieved in a reasonably robust structure.

FIG. 10 shows a variant of the arm member of FIG. 9. Here, a lateral member 94 augments the rectangular cross-section 90, so that the overall cross-section is in the shape of a cross. The lateral member 94 increases the stiffness of the member in the region of the neutral bending axis. The resulting structure can be thought of as similar to two of the "T" shaped arm members of FIGS. 1-4, back-to-back.

Several embodiments employing the invention have been disclosed. However, many variants and modifications to those embodiments will be readily apparent to the skilled addressee. Examples of such variants or modifications are described in the following paragraphs.

Three radially extending arms are shown in each embodiment, but fewer or more arms may be used. The arms, whilst having a radial extent may extend in an axial manner also.

A kinematic support for stylus 14/64 is shown which acts as a safety mechanism to prevent undue strain on element 30/60. However, this feature is not essential or could be replaced or supplemented by another feature which operates in a similar manner.

The sections shown in FIG. 4 and FIG. 5 are not exhaustive. Other sections could be used provided they produce the desired result i.e. a strain sensitive structure which is relatively stiff and therefore robust.

The strain gauges have been shown mounted to the face of each arm opposite the tip of the stylus 64. It is possible to invert the arms 30/62 and mount the gauges on the underside of the element. It will be appreciated that terms used in this description such as "upper", "lower" etc relate to the orientation of the probes shown in the drawings, and that in use the probes shown can be used in any orientation including having the stylus directed upwardly.

The invention claimed is:

1. A probe for position determining apparatus, comprising:
   a probe body,
   a stylus holder, connected or connectable to a workpiece-contacting stylus,
   at least one bendable member, connected between the probe body and the stylus holder, which bends when the stylus contacts a workpiece,
   the bendable member having a neutral axis which is not subject to tension or compression during such bending, and at least one portion of the member lying off the neutral axis, said portion being subject to tension or compression during the bending,
   a strain-sensing element located on said portion which lies off the neutral axis, so as to produce an output signal when the stylus contacts a workpiece,
   the bendable member having a further portion which is closer to the neutral axis than the portion on which the strain-sensing element is located, said further portion having a greater stiffness than the portion on which the strain-sensing element is located.

2. A probe according to claim 1, wherein the bendable member has a cross-section in a direction transverse to the neutral axis which is asymmetrical.

3. A probe for position determining apparatus, comprising:
   a probe body,
   a workpiece-contacting stylus,
   a strain sensitive structure connecting the body and the stylus, the strain sensitive structure including at least one member which has an axis and which is bendable relative to the axis when the stylus contacts a workpiece,
   a strain sensing element associated with said bendable member, so as to provide a signal upon bending thereof,
   wherein the bendable member has a cross-section in a direction transverse to the axis which is asymmetrical.

4. A probe according to claim 2, wherein said cross-section is "T" shaped, and the strain sensing element is mounted to the stem of the "T" shape.

5. A probe according to claim 2, wherein the cross-section is trapezoidal.

6. A probe according to claim 2, wherein the cross-section is "U" shaped.

7. A probe according to claim 1, wherein the bendable member has a composite structure having a cross-section transverse to the axis, the composite structure having a greater stiffness in one part of the cross-section than in another part of the cross-section.

8. A probe according to claim 1, wherein the bendable member has a notch at a position along its length, which modifies its bending.

9. A probe according to claim 1 wherein the bendable member comprises a base and a support for the strain sensing element, the base and the support being separated from each other by spacers.

10. A probe according to claim 1, wherein there is a plurality of said bendable members, extending substantially in a plane.

11. A probe according to claim 9, wherein the bendable members extend in a radial direction relative to the probe body.

12. A probe according to claim 9, wherein the bendable members extend generally circumferentially around an axis of the probe body.

13. A probe for position determining apparatus, comprising:
   a probe body,
   a workpiece-contacting stylus,
   a strain sensitive structure connecting the body and the stylus, the strain sensitive structure including at least one member which has an axis and which is bendable relative to the axis when the stylus contacts a workpiece,
   a pair of strain sensing elements mounted on opposing sides of said bendable member, so as to provide respective signals upon bending thereof, and
   a circuit which receives said signals and processes them differentially to produce a combined output signal.

* * * * *